UNITED STATES PATENT OFFICE.

RAPHAEL GIRARD DE VASSON, OF PARIS, FRANCE, ASSIGNOR TO LA SUBÉRINE, OF SAME PLACE.

PLASTIC COMPOSITION.

SPECIFICATION forming part of Letters Patent No. 479,967, dated August 2, 1892.

Application filed December 22, 1891. Serial No. 415,838. (No specimens.) Patented in France January 22, 1889, No. 195,535, and February 25, 1889, Nos. 196,284 and 196,285; in England July 14, 1890, No. 10,962, and in Belgium January 24, 1891, No. 93,532.

*To all whom it may concern:*

Be it known that I, RAPHAEL GIRARD DE VASSON, of the city of Paris, in the Republic of France, have invented a new and useful Improvement in a Plastic Composition having for its base cork in fragments of all degrees of fineness, (for which I have obtained patents as follows: in Great Britain, No. 10,962, dated July 14, 1890; in Belgium, No. 93,532, dated January 24, 1891, and in France, No. 195,535, dated January 22, 1889, and Nos. 196,284 and 196,285, dated February 25, 1889,) of which the following is a specification.

This invention consists in a new composition having for its base cork in powder or fragments of any degree of fineness and applicable either to the external protection of bricks, roof or flooring tiles, plaques, or building materials of any kind whatever or to the filling of partitions or the plugging of floors; also, applicable as a substitute for the mortars or bétons commonly employed in the foundations of buildings, as a plaster, and for the manufacture of moldings, and, in short, suitable for various uses to which other plastic compositions are put. The substances which I add as an agglutinant to the cork powder or fragments to make my composition are plaster-of-paris or sulphate of lime, dextrine or similar adhesive material, and a small quantity of sesquioxide of iron, the last-mentioned substance giving hardness and resistance to the composition and giving it the color of terra-cotta. When the composition is to be used in damp places, I add to it a certain quantity of oxychloride, such as oxychloride of zinc.

The preparation of the composition may be made in two different ways.

According to the first mode of operation I mix dry the cork powder with the sulphate of lime and the sesquioxide of iron, (about one to two volumes of cork powder to two to one volumes of the other matters.) Then I dissolve dextrine in enough water to make a mixture of plastic consistency, (about five hundred grams of dextrine to twenty kilograms of a mixture of sulphate of lime and sesquioxide of iron.) The mixture may be made in a hot state if it be desired to hasten the setting of the cement.

According to the second mode of operation I mix dry the sulphate of lime, the sesquioxide of iron, and the dextrine. Then I incorporate dry the powder of cork into the mass and then mix with it the necessary quantity of hot or cold water to give the mass sufficient plasticity. In this second case the mixing of the cement may be made either with pure water or with a solution of gelatine or glue.

In cases in which an oxychloride—the oxychloride of zinc, for example—is to be incorporated with the composition, as hereinabove mentioned, I add to the cork powder and to the other powders which are mixed with it some of the oxide of zinc of commerce and I add to the mixing-water some chloride of zinc. The degree of concentration of this solution of chloride of zinc may be varied from about 30° to 50° Baumé, which variation will vary the setting of the cement or mortar obtained and the density of the final product. The proportion of the oxide of zinc to mix with the cork powder depends on the degree of fineness of the latter (the oxide of zinc filling the cavities) and the density which it is desired to give to the composition.

This composition is water-proof, has a very low conductivity of heat, and has a high degree of imperviousness to sound.

What I claim as my invention is—

1. A composition consisting of from one to two volumes of fragments or powder of cork and two to one volumes of an agglutinant composed of plaster-of-paris, dextrine, and sesquioxide of iron, substantially as herein set forth.

2. A composition consisting of one to two volumes of fragments of powder of cork and two to one volumes of an agglutinant composed of plaster-of-paris, dextrine, sesquioxide of iron, and an oxychloride, such as the oxychloride of zinc, substantially as herein described.

In witness whereof I have hereunto set my hand in the presence of two subscribing witnesses.

RAPHAEL GIRARD DE VASSON.

Witnesses:
LOUIS GENÈS,
ROBT. M. HOOPER.